United States Patent
Li et al.

(10) Patent No.: US 8,259,778 B2
(45) Date of Patent: Sep. 4, 2012

(54) METHOD AND TRANSCEIVER APPARATUS FOR TRANSMITTING PAGING INFORMATION IN ORTHOGONAL FREQUENCY-DIVISION MULTIPLEXING SYSTEMS

(75) Inventors: Guangjie Li, Shanghai (CN); Hongwei Yang, Shanghai (CN)

(73) Assignee: Alcatel Lucent, Paris (FR)

( * ) Notice: Subject to any disclaimer, the term of this patent is extended or adjusted under 35 U.S.C. 154(b) by 2650 days.

(21) Appl. No.: 10/747,186

(22) Filed: Dec. 30, 2003

(65) Prior Publication Data

US 2004/0151231 A1     Aug. 5, 2004

(30) Foreign Application Priority Data

Dec. 31, 2002 (CN) .................................. 02 1 60552

(51) Int. Cl.
*H04B 1/707* (2011.01)
(52) U.S. Cl. .......................................................... 375/146
(58) Field of Classification Search .................. 375/259, 375/260, 130, 140, 146, 147, 295, 316
See application file for complete search history.

(56) References Cited

U.S. PATENT DOCUMENTS

| | | | | |
|---|---|---|---|---|
| 6,865,218 | B1 * | 3/2005 | Sourour | 375/148 |
| 6,930,989 | B1 * | 8/2005 | Jones, IV et al. | 370/335 |
| 2003/0224731 | A1 * | 12/2003 | Yamaura et al. | 455/63.3 |

FOREIGN PATENT DOCUMENTS

EP     1180866 A1 *   2/2002

OTHER PUBLICATIONS

U.S. Appl. No. 10/981,497, filed Nov. 5, 2004, entitled "Method of Idle Control in OFDM System."

* cited by examiner

*Primary Examiner* — Kevin M Burd
(74) *Attorney, Agent, or Firm* — Sughrue Mion, PLLC

(57) ABSTRACT

The present invention provides a method for transmitting paging information in orthogonal frequency-division multiplexing (OFDM) systems as well as the transmitter and receiver apparatus for its application. The method features itself in the following aspects: An auxiliary paging channel is employed dedicatedly for spread-spectrum modulation or digital modulation of the paging information. When the receiver is in a standby state, paging information can be obtained by means of spread spectrum demodulation or digital demodulation with no need to conduct FFT. This leads to a great reduction in power consumption and less power is consumed when the receive devices are in standby state, hence achieving aim to lengthen the usable time of a battery in a mobile phone.

13 Claims, 2 Drawing Sheets

METHOD AND TRANSCEIVER APPARATUS FOR TRANSMITTING PAGING INFORMATION IN ORTHOGONAL FREQUENCY-DIVISION MULTIPLEXING SYSTEMS

BACKGROUND OF THE INVENTION

1. Field of the Invention

The present invention relates to information transmission in a cellular communication system of OFDM, especially to the transmission of paging information in a standby state.

2. Description of the Related Art

In orthogonal frequency-division multiplexing systems, all the information to be transmitted is transformed by the OFDM modulation unit with IFFT (Inverse Fast Fourier Transform) algorithm at the transmit apparatus. Then the modulated information is emitted out via radio transmit front-end before it reaches the radio receive front-end through wireless channel. The information finally is transferred by radio receive front-end to the OFDM demodulating unit for FFT (Fast Fourier Transform) operation. Such IFFT and FFT operations require complex calculation. The amount of calculation is large and hence the power consumption is high.

Furthermore, for purpose of high-speed data transmission, usually a big operation length is set for FFT operation, namely the number of subcarriers is rather big, such as 1024, 2048 and so on. Therefore the operation is more complex. If the time for an OFDM symbol is 0.1 second in a system, it will take 51200 times of complex multiplication and 102400 times of complex addition per second to accomplish a 1024-point FFT operation. Such complex operation will lead to great power consumption.

Especially in receive device, for instance a mobile phone, only demodulation is needed in sleeping mode (namely standby state) to get paging information. But if we conduct FFT operation every time when paging occurs, there will be great power consumption in the mobile phone's battery. Hence it will reduce the usable time of the battery after charge.

SUMMARY OF THE INVENTION

The invention is to resolve said problems. The invention's object is to provide a method for transmitting paging information in OFDM systems as well as transmit and receive apparatus to apply it. In standby state, receive apparatus conduct spread spectrum demodulation or digital demodulation at low power consumption to find paging information needed. By this means power consumption in standby state can be reduced and the usable time of battery is prolonged.

The invention is implemented as below:

A method for transmitting paging information in orthogonal frequency-division multiplexing (OFDM) systems, comprising the steps below:

a) Setting individually an auxiliary paging channel (APCH) in the transmit device for paging information;
b) Conducting spread-spectrum modulation or digital modulation on described paging information in said auxiliary paging channel;
c) Overlapping the modulated signal in step b on OFDM channel signal; and
d) In receive apparatus, paging information from APCH is demodulated out in a sleeping mode by means of spread spectrum demodulation or digital demodulation to page users.

Digital modulation in step (b) is FSK or QPSK digital modulation.

Modulated signal in step (c) is overlapped on training symbols of the OFDM channel signal or on the whole OFDM channel signal.

Modulated signal in step (c) is of a relatively low power when added to the whole OFDM channel signal compared with the case when overlapped on training symbols. Spread-spectrum modulation in step (b) may employ larger spread-spectrum factors in comparison with those when modulated signals is overlapped on training symbols.

Spread-spectrum code may be adopted for spread spectrum demodulation of step (d).

In step (c) APCH information is distributed discretely to the positions of training symbols when the modulated signal is overlapped on training symbols. Said training symbols are constituted by pseudo random noise sequences.

A transmit device used in OFDM system, comprising: FFT on transmitted information, OFDM modulating unit that generates OFDM channel signals and radio transmit front-end used to transmit said OFDM channel signals and further comprising:

APCH channel unit serving to conduct spread spectrum modulation or digital modulation on paging information contained in said transmitted information; and
adding unit, which overlaps signals modulated by said APCH channel on OFDM channel signal outputted from the OFDM modulating unit and transmit them via radio transmit front-end.

The adding unit overlaps signal modulated by said PACH channel on training symbols of OFDM channel signal or the whole OFDM channel signal outputted by said OFDM modulation unit.

A receive device used in OFDM systems, comprising the radio receive front-end used to receive OFDM channel signal which contains the paging information modulated by spread-spectrum or digital modulation, the OFDM demodulating unit employed to conduct FFT and control unit which outputs the switching indication corresponding to the work mode of the receiver; also further comprising:

mode-switching module, which acts to switch between working mode and sleeping mode according to the switching indication from the control unit so as to change the flowing direction of the signal at said radio receive front-end; and
APCH demodulating unit, which conducts spread spectrum demodulation or digital demodulation on received paging information modulated by spread spectrum or digital modulation to obtain the paging information when the device is switched to sleeping mode by mode-switching module.

According to the present invention, an auxiliary paging channel is set individually, which conducts spread spectrum modulation or digital modulation on paging information at low power consumption. The modulated signal is added to training symbols of the OFDM channel signal or to the whole OFDM channel signal before they are transmitted together. Desired information can be obtained by means of spread spectrum demodulation or digital demodulation on the auxiliary paging channel at low power consumption with no need of FFT operation, which consumes much power. This reduces power consumption in standby state and therefore prolonged the usable time of battery.

DETAILED DESCRIPTION OF THE INVENTION

Figure 1:
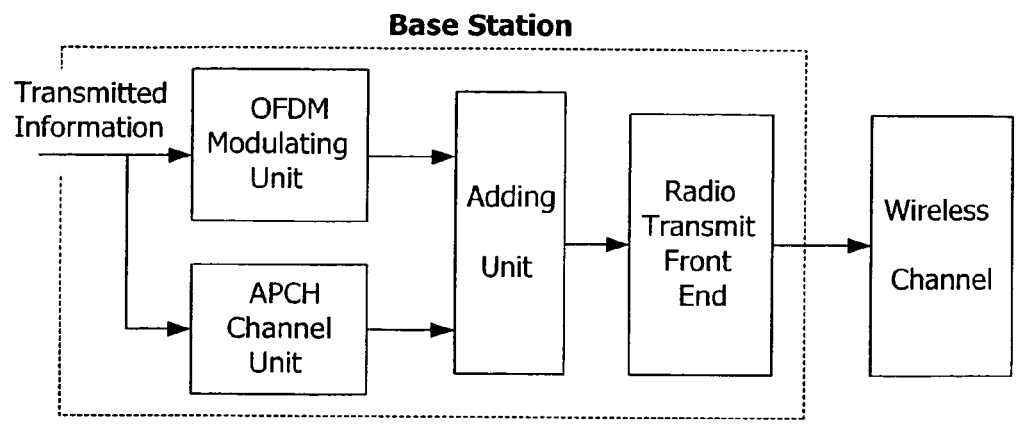
FIG. 1(a) depicts the functional block diagram of the correlative portion of the base station in embodiment 1 of the present invention.
FIG. 1(b) illustrates the functional block diagram of the correlative portion of the mobile station in embodiment 1 of the present invention.
Figure 1:
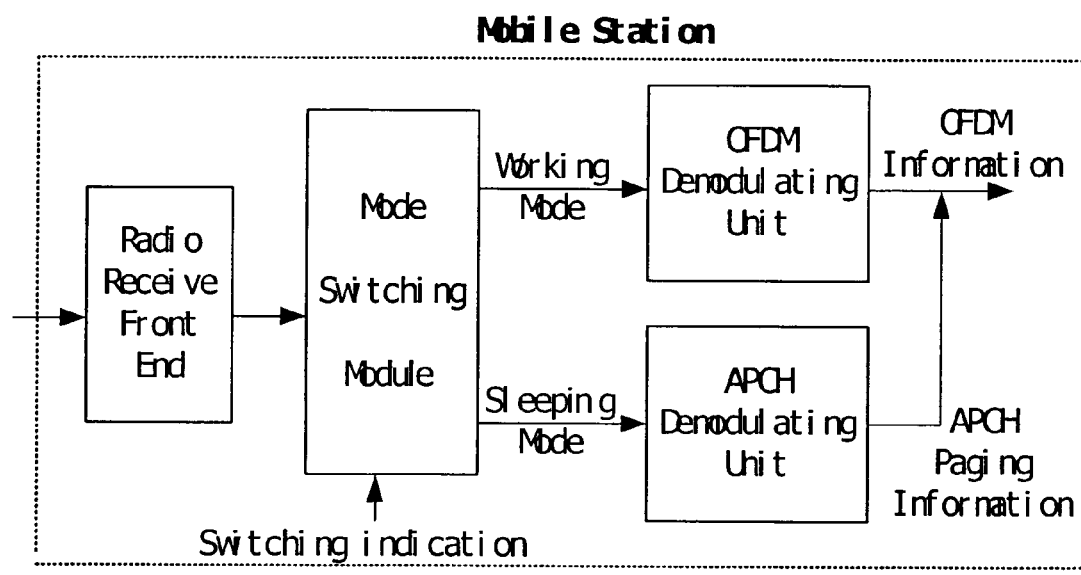

A further detailed description about the present invention is given below according to the appended figures of embodiments:

FIG. 1(a) is part of the function block diagram of an implemented base station related to this invention in OFDM systems. There is an OFDM modulating unit as well as a radio transmit front-end in the present OFDM base station. The OFDM modulating unit conducts IFFT on the information to be transferred, producing OFDM channel signal that is later transmitted by radio transmit front-end. Other components of the base station are prior arts, so is not shown and their descriptions are omitted. A dedicated APCH channel unit, which conducts spread spectrum modulation or digital modulation such as FSK and QPSK on the transmitted information containing paging information, is added in this invention. Also an adding unit is enrolled. The adding unit adds the signal modulated by APCH channel unit to OFDM channel signal modulated by OFDM modulating unit. Two adding modes are available, as to be described. The added signals are transmitted by radio transmit front-end.

FIG. 1(b) is part of the function block diagram of an implemented mobile station related to this invention in OFDM systems. There is a radio receive front-end as well as an OFDM demodulating unit in the present OFDM mobile station. The radio receive front-end receives OFDM channel signal, which is later transformed by OFDM demodulating unit to the output demodulated signal via FFT operation. Other components of the mobile station are prior arts, so is not shown and their descriptions are omitted. A mode switching module and an APCH demodulating unit are introduced to this invention. Signals from base station are received by the radio receive front-end and output to mode switching module. When the mobile station is on-line, the mode is set to "working mode" to obtain the broadcasting information of the cell. In working mode, if the mobile station does not transmit or receive the signals in a period, the control unit will output the switching indication to mode-switching module to switch the mobile station to the "sleeping mode", in the sleeping mode, the mobile station monitors APCH. If the base station paging the mobile station is detected, or the mobile station is calling, the control unit will output the switching indication to mode-switching module to switch the mobile station to "working mode". Here, under the sleeping mode, mode-switching module will make signals flow to APCH demodulating unit. By means of spread-spectrum code or digital demodulation, APCH demodulating unit demodulates out the paging information contained in OFDM channel signals for purpose of paging users.

Figure 2:
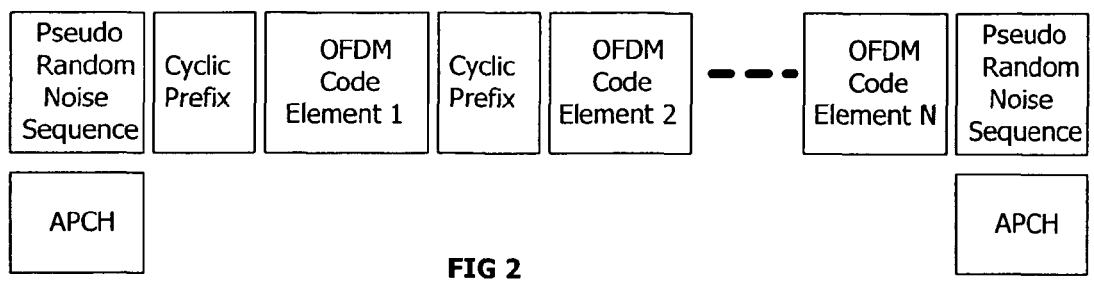
FIG. 2 is the schematic diagram that modulated paging information is added to training symbols of the OFDM channel signal.
Figure 3:
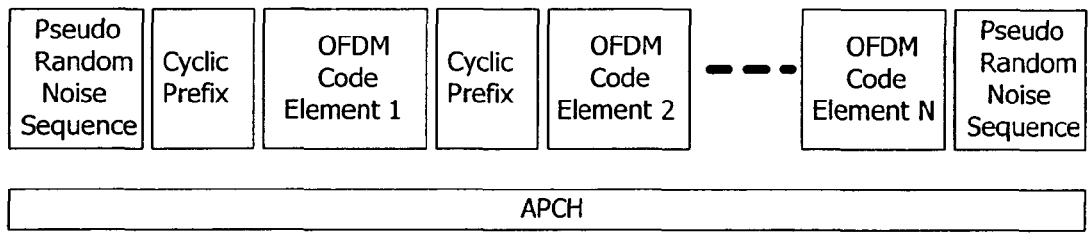
FIG. 3 is the schematic diagram that modulated paging information is added to the whole OFDM channel signal.

Referring to FIG. 2 and FIG. 3, two adding modes are available for the adding unit.

One of the modes, in adding unit, demodulated signals by APCH channel unit may be overlapped on training symbols of the OFDM channel signal, as illustrated in FIG. 2. In such a way information of APCH is discretely distributed to the position of training symbols. In general OFDM systems training symbols will be inserted. Those training symbols are constituted by pseudo random noise sequences and other known symbols.

The other mode, demodulated signals by APCH channel may be overlapped on the whole OFDM channel signal, as illustrated in FIG. 3. In this mode energy of APCH channel signal may be very low, therefore interference to OFDM signals is rather small. At the same time large spread spectrum factors may be employed because the whole APCH period is very long. Furthermore at the mobile station paging information in APCH can be demodulated out to page users even if the signal is very weak.

Embodiment 1 is only one of the implementations of this invention. Said base station is only a case of the transmit devices in OFDM systems, so as said mobile station versus the receive devices. Any transmit and receive apparatus in OFDM system can implement this invention.

What is claimed is:

1. A method for transmitting paging information in orthogonal frequency-division multiplexing (OFDM) systems, comprising the steps of:
   a) establishing an auxiliary paging channel (APCH) in the transmitter device for paging information;
   b) conducting one of spread-spectrum modulation or digital modulation on the paging information in said auxiliary paging channel;
   c) overlapping the modulated signal in step b on an OFDM channel signal carrying information to be transmitted; and
   d) in a receive apparatus, demodulating paging information from the APCH in a sleeping mode by one of spread spectrum demodulation or digital demodulation to page users.

2. The method according to claim 1, wherein digital modulation in step (b) is FSK or QPSK digital modulation.

3. The method according to claim 1, wherein the modulated signal in step (c) is overlapped on training symbols of the OFDM channel signal.

4. The method according to claim 1, wherein modulated signal in step (c) is overlapped on the whole OFDM channel signal.

5. The method according to claim 1, wherein the modulated signal in step (c) is of a relatively low power when overlapped on the whole OFDM channel signal compared with the case when overlapped on training symbols.

6. The method according to claim 5, wherein spread spectrum modulation in step (b) may employ relatively larger spread spectrum factors in comparison with those when the modulated signal is overlapped on training symbols.

7. The method according to claim 1, wherein spread-spectrum code may be adopted for said spread-spectrum demodulation of step (d).

8. The method according to claim 1, wherein APCH information in step (c) is distributed discretely to the positions of training symbols when the modulated signal is overlapped on training symbols.

9. The method according to claim 3, wherein said training symbols are constituted by pseudo random noise sequences.

10. A transmit device used in OFDM systems, comprising: an FFT operation on transmitted information, an OFDM modulating unit that generates OFDM channel signals, and a radio transmit front-end used to transmit said OFDM channel signals; said transmit device further comprising:
    an APCH channel unit conducting one of spread-spectrum modulation or digital modulation on paging information contained in said transmitted information; and an adding unit which overlaps signals modulated by said APCH channel onto said OFDM channel signal outputted from the OFDM modulating unit and carrying information to be transmitted, and transmits the result via a radio transmit front-end.

11. The transmit device according to claim 10, wherein the adding unit overlaps a signal modulated by said APCH channel on training symbols of OFDM channel signal outputted from the OFDM modulation unit.

12. The transmit device according to claim 10, wherein the adding unit overlaps a signal modulated by said APCH channel on the whole OFDM channel signal outputted by said OFDM modulation unit.

13. A receive device used in OFDM systems, comprising a radio receive front-end used to receive an OFDM channel signal which contains paging information modulated by one of spread-spectrum or digital modulation and overlapped onto at least portions of said OFDM channel signal carrying information to be transmitted, an OFDM demodulating unit employed to conduct FFT, and a control unit which outputs a switching indication corresponding to the working mode of the receiver, said receive device further comprising:

a mode switching module which acts to switch between a working mode and a sleeping mode according to the switching indication from the control unit so as to change a flowing direction of the signal at said radio receive front-end; and an APCH demodulating unit, which spread spectrum or digitally demodulates received paging information modulated by spread spectrum or digital modulation to obtain paging information when the device is switched to sleeping mode by the mode-switching module.

* * * * *